United States Patent [19]
Goto et al.

[11] Patent Number: 4,703,144
[45] Date of Patent: Oct. 27, 1987

[54] EDM CONTROL SYSTEM TO MAXIMIZE EFFICIENCY BY CONTROLLING THE GAP WIDTH

[75] Inventors: Makoto Goto, Toki; Takao Okabe; Akihiro Komori, both of Nagoya, all of Japan

[73] Assignee: Brother Kogyo Kabushiki Kaisha, Aichi, Japan

[21] Appl. No.: 711,168

[22] Filed: Mar. 13, 1985

[30] Foreign Application Priority Data

Mar. 19, 1984 [JP] Japan .................. 59-53193

[51] Int. Cl.⁴ .................. B23H 1/02; B23H 7/18
[52] U.S. Cl. .................. 219/69 P; 219/69 C; 219/69 G
[58] Field of Search .................. 219/69 C, 69 S, 69 G, 219/69 P, 69 W; 204/224 M, 129.5

[56] References Cited

U.S. PATENT DOCUMENTS

| | | | |
|---|---|---|---|
| 3,340,478 | 9/1967 | Poerschke | 219/69 G |
| 3,381,107 | 4/1968 | Poerschke | 219/69 G |
| 3,474,216 | 10/1969 | Morgan, Jr. | 219/69 G |
| 3,825,715 | 7/1974 | Saito et al. | 219/69 C |
| 3,864,541 | 2/1975 | Inoue | 219/69 C |
| 3,916,138 | 10/1975 | Pfau | 219/69 P |
| 3,943,321 | 3/1976 | Pfau et al. | 219/69 P |
| 3,996,445 | 12/1976 | Wohlabaugh | 219/69 G |
| 3,997,753 | 12/1976 | Inoue | 219/69 C |
| 3,999,028 | 12/1976 | Saito et al. | 219/69 P |
| 4,185,184 | 1/1980 | Pfau | 219/69 G |
| 4,321,451 | 3/1982 | Inoue | 219/69 C |
| 4,361,745 | 11/1982 | Rupert et al. | 219/69 G |
| 4,404,448 | 9/1983 | Bommeli | 219/69 G |
| 4,559,434 | 12/1985 | Kinoshita | 219/69 M |

FOREIGN PATENT DOCUMENTS

| | | | |
|---|---|---|---|
| 2256649 | 6/1973 | Fed. Rep. of Germany | 219/69 C |
| 144626 | 9/1982 | Japan | 219/69 C |
| 770717 | 10/1980 | U.S.S.R. | 219/69 G |

OTHER PUBLICATIONS

"Micro Computer Controlled Spark–Erosion" by Heavelman et al. in the Sep./Oct. 1980 issue of EDM Digest.

*Primary Examiner*—A. D. Pellinen
*Assistant Examiner*—Geoffrey S. Evans
*Attorney, Agent, or Firm*—Parkhurst & Oliff

[57] ABSTRACT

An electric discharge machine has a CPU that controls a switching element that supplies a pulse voltage to the gap between an electrode (which may be a wire electrode) and a workpiece. The CPU is able to determine the average pre-discharge time (the average time between the turning on of the switching element and the start of each electrical discharge) based on the sampling time interval and the counted number of discharges that occurred during the sampling time interval, by turning off the switching element at a set time after the start of each electrical discharge, and turning the switching element on again after a longer set time has elapsed from the start of each electrical discharge. The average gap voltage and average gap current are then calculated and displayed from this data. The feeding of the electrode and the workpiece relative to each other is controlled to reduce the difference between the counted number of discharges that occurred during the sampling time interval and a calculated desired number of discharges.

13 Claims, 5 Drawing Figures

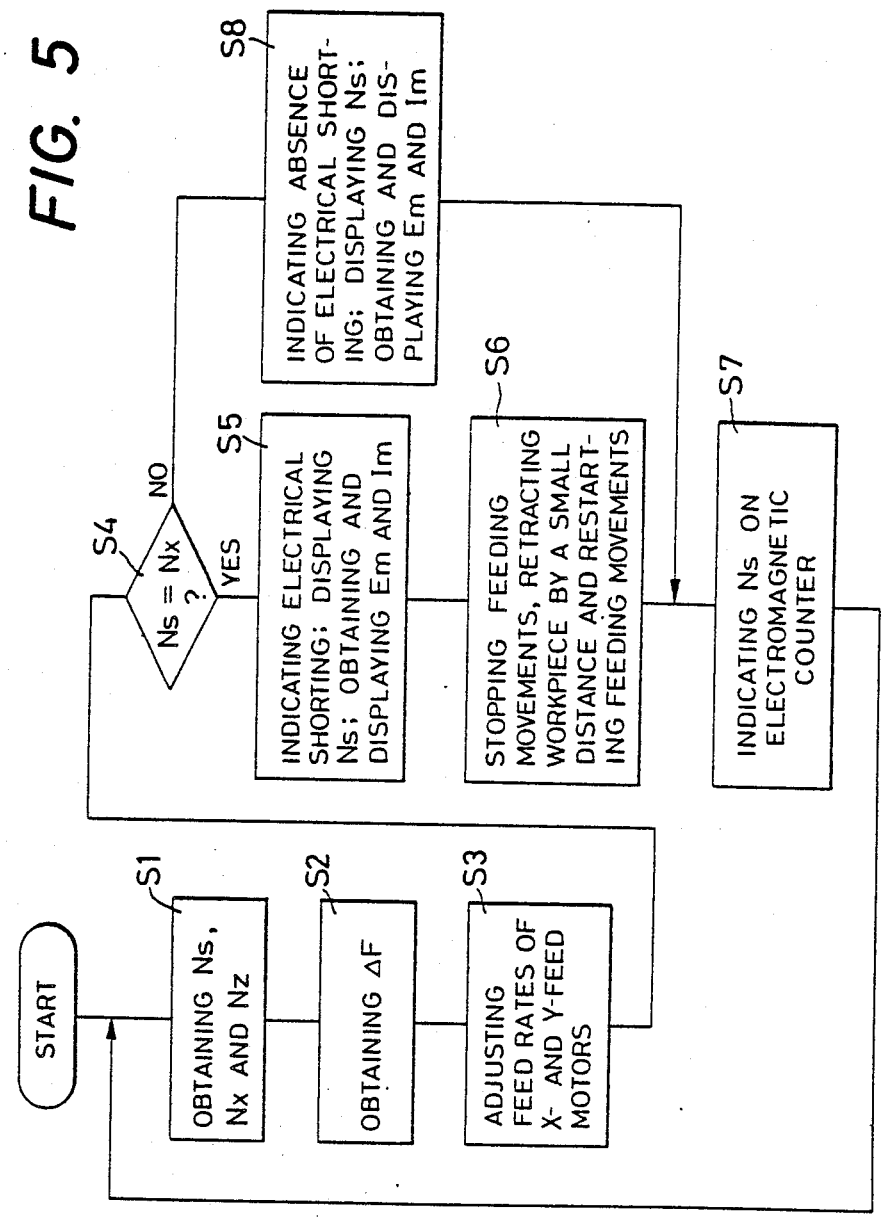

EDM CONTROL SYSTEM TO MAXIMIZE EFFICIENCY BY CONTROLLING THE GAP WIDTH

BACKGROUND OF THE INVENTION

The present invention relates to an electrical discharge machining system for machining a workpiece by means of an electrical discharge energy between an electrically conductive workpiece (anode) and a tool, i.e., an electrode (cathode), while the workpiece and the electrode are fed relative to each other.

In such an electrical discharge machining system, the period of each electrical discharge cycle consists of a pre-discharge time, an electrical-discharge time following the pre-discharge time, and a rest time following the electrical-discharge time. In the pre-discharge time, a voltage is applied between the workpiece and the electrode so that an electrical discharge may take place between the workpiece and the electrode when the machining gap therebetween becomes narrower than a critical value. The electrical discharge exists during the electrical-discharge time. During the rest time, no voltage is applied between the workpiece and the electrode.

In an electrical machining system of wire cutting type, for example, optimum values of the electrical-discharge time and the rest time are predetermined depending upon specific machining conditions, such as material of the workpiece, machining depth (height of the workpiece), rate of lengthwise feed of the wire electrode, and desired surface finish of the workpiece. These electrical-discharge time and rest time are indispensable to an electrical discharge machining process. However, the pre-discharge time is not indispensable or essential to the machining process itself. This pre-discharge time is determined in connection with a rate at which the workpiece and the wire electrode are fed relative to each other. Therefore the length of the pre-discharge time, which is a time interval between the start of application of a gap voltage and the start of an electrical discharge, is important for improving the efficiency of machining. For efficient machining, this pre-discharge time which is not fixed, must be kept to a minimum to the extent that the workpiece and the electrode will not contact each other, to prevent electrical short-circuiting of the power supply circuit.

In light of the above, it has been known to detect a voltage at a machining gap between the workpiece and the electrode, e.g., wire electrode, for the purposose of controlling feeding movements of the workpiece relative to the electrode. The detected gap voltage (voltage data) is applied to a control device such as a central processing unit (CPU), via a filter, an isolator and an A/D converter. The control device compares the detected gap voltage to a predetermined reference voltage, and the difference between the two voltages is used as the input signal to a controller of feeding units to feed the workpiece relative to the electrode for efficient machining operation. Although this feed control method is highly reliable, it needs the use of electrical components or circuits such as the aforementioned filter, isolator and A/D converter, and thereby complicating the electric control device of the machining system. Further, the above method suffers a problem that a contact of the workpiece with the wire electrode makes it impossible to detect the gap voltage and therefore makes it difficult to achieve an accurate control of the feed rate. In the case where the machining operation requires a relatively long rest time after each electrical discharge, using a relatively high feed rate may cause a contact between the workpiece and the electrode. If this happens, the gap voltage falls to substantially zero level, whereby the measurement of the gap voltage for controlling the feed rate is disturbed by noises and other factors resulting from the electrical contact between the workpiece and the electrode. Thus, the prior art method is not capable of controlling the relative feeding movements between the workpiece and the electrode so as to attain maximum machining efficiency of the machining system.

SUMMARY OF THE INVENTION

It is therefore an object of the present invention to provide an electrical discharge machining system which is capable of controlling relative feeding movements between the workpiece and the electrode so as to attain maximum machining efficiency under any machining conditions which determine the electrical-discharge time and rest time of each electrical discharge cycle, without using a detecting device as used in the prior art to detect a voltage at the machining gap between the workpiece and the electrode.

Another object of the invention is the provision of such an electrical discharge machining system which has means for monitoring the machining conditions.

According to the invention, there is provided an electrical discharge machining system wherein an electrically conductive workpiece and an electrode are moved relative to each other with a machining gap maintained between the electrode and the workpiece, and wherein the workpiece is machined through the energy of electrical discharges at the machining gap by application of a voltage between the workpiece and the electrode, comprising: (a) a feed device for effecting a relative feeding movement between the workpiece and the electrode; (b) an electrical discharge power supply circuit for applying power from a power source to the workpiece and the electrode, the power supply circuit incorporating a switching element which closes and opens the power supply circuit; (c) switching control means for turning on and off the switching element; (d) a counter for counting the number of actual electrical discharges which have occurred between the workpiece and the electrode during a preset sampling interval; and (e) feed control means for controlling the operation of the feed device.

The switching control means turns off the switching element at the end of a first predetermined time interval after a start of each electrical discharge between the workpiece and the electrode while the switching element is held on, and turns on the switching element at the end of a second predetermined time interval after the start of each electrical discharge, the second predetermined time interval being longer than the first predetermined time interval. The feed control means regulates a rate of the relative feeding mvoement between the workpiece and the electrode, so as to reduce a difference between the number of the actual electrical discharges counted by the counter, and a preset optimum number of electrical discharges.

In the electrical discharge machining system constructed as described above, the feed rate of the feed device or the rate of relative movement between the workpiece and the electrode is controlled by the feed control means. In this connection, it is noted that the feed rate affects a pre-discharge time between the turning-on of the switching element and the start of each electrical discharge. Therefore, by controlling the feed rate of the feed device as stated in the above paragraph, the number of electrical discharges or sparks per unit of time (sampling interval) are controlled by the feed control means so that the number of sparks during each sampling interval coincides with an optimum value which is preset to attain efficient electrical discharge machining. Since the first and second time intervals after the start of each electrical discharge are predetermined to suit the specific machining conditions, controlling the number of electrical discharges during each sampling interval permits the regulation of the above-indicated pre-discharge time. Accordingly, the average pre-discharge time of the electrical discharge cycles is controlled to an optimum level to attain maximum efficiency of machining without electrical shorting of the workpiece and the electrode.

According to one embodiment of the invention, the switching control means comprises: detecting means for detecting said start of each electrical discharge and generating a detection signal indicative of said start; a first timer responsive to each of the detection signals to start measurement of the first predetermined time interval; a second timer responsive to each detection signal to start measurement of the second predetermined time interval; and means for turning off the switching element when the first timer has timed out, and for turning on the switching element when the second timer has timed out.

According to another embodiment of the invention, the feed control means comprises means for detecting an actual feed rate of the feed device, and means for calculating a target feed rate based on the counted number of actual electrical discharges, the preset optimum number of electrical discharges, and the detected actual feed rate. The feed control means controls the operation of the feed device so as to reduce a difference between the detected actual feed rate and the calculated target feed rate.

In accordance with a further embodiment of the invention, the machining system further comprises monitoring means for monitoring machining conditions of the machining system. The monitoring means compares the counted number of actual electrical discharges counted by the counter, to a predetermined reference number of electrical discharges which is different from said preset optimum number, and provides a monitoring output according to a relation between said counted number and said predetermined reference number. In one form of this embodiment, the predetermined reference number represents the number of electrical discharges which take place during the sampling interval, provided that a pre-discharge time interval between the turning-on of the switching element and the start of each electrical discharge is zero. The monitoring means provides an output signal indicative of a physical contact of the electrode with the workpiece when the counted number of actual electrical discharges is substantially equal to the predetermined reference number.

According to a still further embodiment of the invention, the machining system further comprises arithmetic means for calculating an average pre-discharge time between the turning-on of the switching element and the start of each electrical discharge, based on the sampling time, the second predetermined time interval and the counted number of said actual electrical discharges. The second predetermined time interval being a sum of an electrical-discharge time represented by said first predetermined time, and a rest time followed by said pre-discharge time.

In one form of the above embodiment, the machining system further comprises means for calculating an average gap voltage applied between the workpiece and the electrode, based on the average pre-discharge time, the electrical-discharge time, the rest time, and actual gap voltages applied between the workpiece and the electrode during individual lengths of the pre-discharge and electrical-discharge times, and further comprises display means for indicating the calculated average gap voltage. In this form of the invention, a voltmeter is not necessary to monitor the machining conditions.

In another form of the above embodiment, the machining system further comprises means for calculating an average gap current flowing through said machining gap, based on the average pre-discharge time, the electrical-discharge time, the rest time, and an actual gap current flowing through the machining gap during the length of said electrical-discharge time, and further comprising display means for indicating the calculated average gap current. According to this form of the invention, an ammeter is not required to monitor the electrical discharge condition.

The electrode used in the instant machining system may consist of a metal wire which is continuously fed lengthwise along the machining gap relative to the workpiece.

BRIEF DESCRIPTION OF THE DRAWING

These and other objects, and many of the attendant features and advantages of this invention will be readily appreciated as the same becomes better understood by reference to the following detailed description of an illustrative embodiment when considered in connection with the accompanying drawing, in which:

FIG. 5 is a flow chart depicting the opertion of a central processing unit of the control system of the machining system.

DETAILED DESCRIPTION OF THE PREFERRED EMBODIMENT

Figure 1:
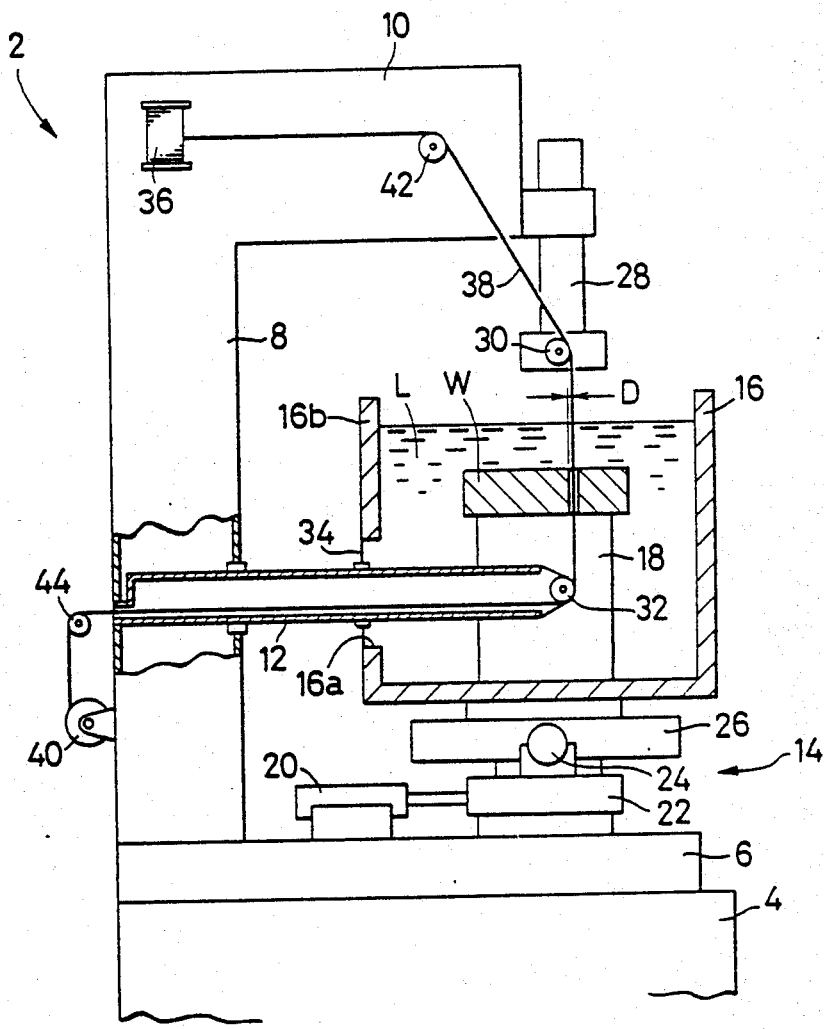
FIG. 1 is a schematic view partly in cross section of a wire cutting type electrical discharge machining system embodying the present invention.

There is shown in FIG. 1 an electrical discharge machining system of wire cutting type according to one embodiment of the present invention. The machining system has a frame 2 which includes a base 4, a bed 6 mounted thereon, a column 8 resting on the left end (in FIG. 1) of the base 4, an upper arm 10 extending horizontally from the upper end of the column 8 in the rightward direction (FIG. 1), and a tubular lower arm 12 extending in parallel with the upper arm 10 from the vertically middle portion of the column 8. On the bed 6, there is disposed a work pan 16 with an X-Y feed device 14 interposed therebetween. The work pan 16 is filled with a machining dielectric fluid L and is movable in a horizontal X-Y plane by the feed device 14. A work table 18 is mounted on the bottom wall of the work pan 16 so as to support an electrically conductive workpiece W. The X-Y feed device 14 comprises a Y-axis slide 22 which is mounted on the bed 6 such that the slide 22 is slidably movable to the left and right, i.e., along a Y axis in the horizontal plane, by the action of a Y-feed motor 20. The X-Y feed device 14 further comprises an X-axis slide 26 mounted on the Y-axis slide 22 slidably movable in the forward and backward directions, i.e., along an X axis perpendicular to the Y-axis, by the action of an X-feed motor 24. Movements of the Y-axis and X-axis slides 22 and 26 cooperate to enable the workpiece W to move in an desired directions in the horizontal X-Y plane.

The upper arm 10 is provided, at its free or right end just above the work pan 16, with a height adjustable head 28 which has on its lower end an upper electrode guide 30. The lower arm 12 extends passing through an elongate aperature 16a in a side wall 16b of the work pan 16 opposite to the column 8, so that a lower electrode guide 32 at the free end of the lower arm 12 is positioned below the workpiece W. The elongate aperture 16a is formed along the X axis so that the work pan 16 is movable along the X axis, as well as along the Y axis, relative to the stationary lower arm 12. A fluid-tight sealing between the side wall 16b and the lower arm 12 is maintained by sealing means 34 which fluid-tightly closes the elongate aperture 16a while permitting relative movements between the work pan 16 and the lower arm 12 in the horizontal X-Y plane.

On an upper part of the column 8, a wire supply device 36 is disposed to supply a tool in the form of a wire electrode 38 made from a suitable metallic wire. In the meantime, a wire take-up device 40 is disposed on a lower part of the column 8, to wind up the wire electrode 38. The wire electrode 38, which is fed from the wire supply device 36, is threaded through the machine along a path which is defined by a guide roller 42 provided on the upper arm 10, the upper electrode guide 30 on the adjustable head 28, the lower electrode guide 32 on the free end of the lower arm 12, a guide roller 44 provided on the column 8, and the take-up device 40. Described in more detail, the wire electrode 38 from the supply device 36 is guided by the roller 42 and the upper electrode guide 30, and is passed through a gap in the workpiece W. The wire electrode 38 is then guided by the lower electrode guide 32, inserted through the tubular lower arm 12, and guided by the roller 44 so as to be finally wound on the take-up device 40 with a suitable tension applied to the portion of the electrode wire 38 between the supply and take-up devices 36 and 40.

In operation, voltage pulses are applied between the workpiece W and the wire electrode 38 through the lower arm 12, and the upper electrode guide 30 which serves as an electrical contactor. For this purpose, the lower arm 12 is electrically connected to the workpiece W, and the upper electrode guide 30 electrically contacts the wire electrode 38 while guiding the same. Upon application of such voltage pulses so that the level of the electrode 38 is negative, electrical discharges take place and sparks jump a machining gap D between the workpiece W and the electrode 38 through the machining fluid L.

Figure 2:
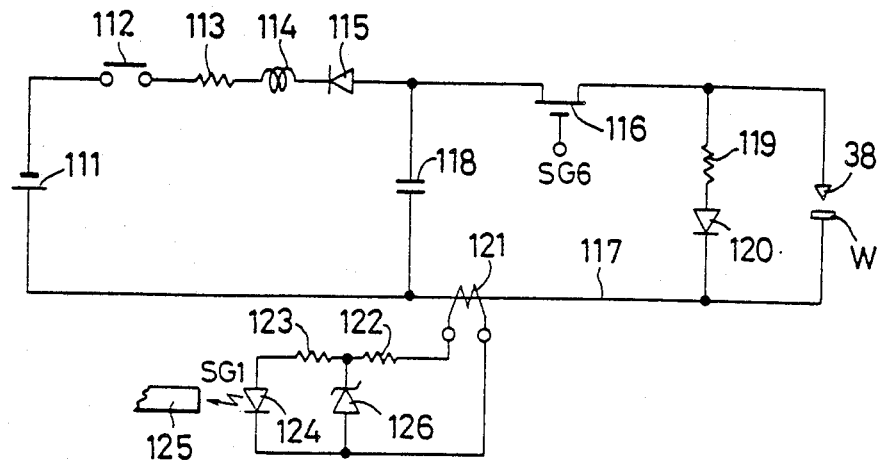
FIG. 2 is a diagram showing an electrical discharge power supply circuit and a circuit for detecting electrical discharges, used in the machining system according to FIG. 1.
Figure 3:
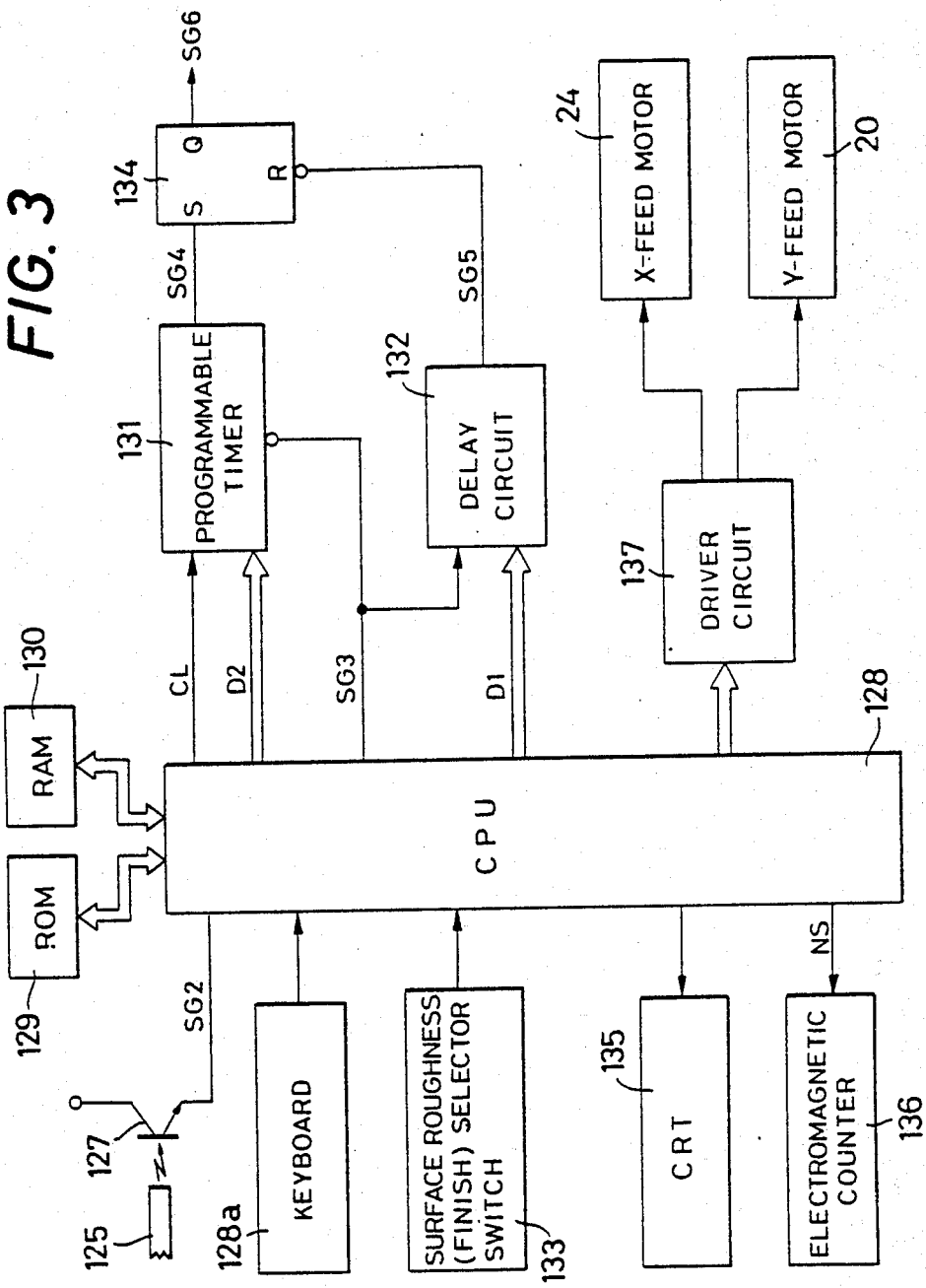
FIG. 3 is a schematic block diagram of a control system of the machining system of FIG. 1.

Referring next to FIGS. 2 and 3, a control system of the instant machining system will be described.

Figure 4:
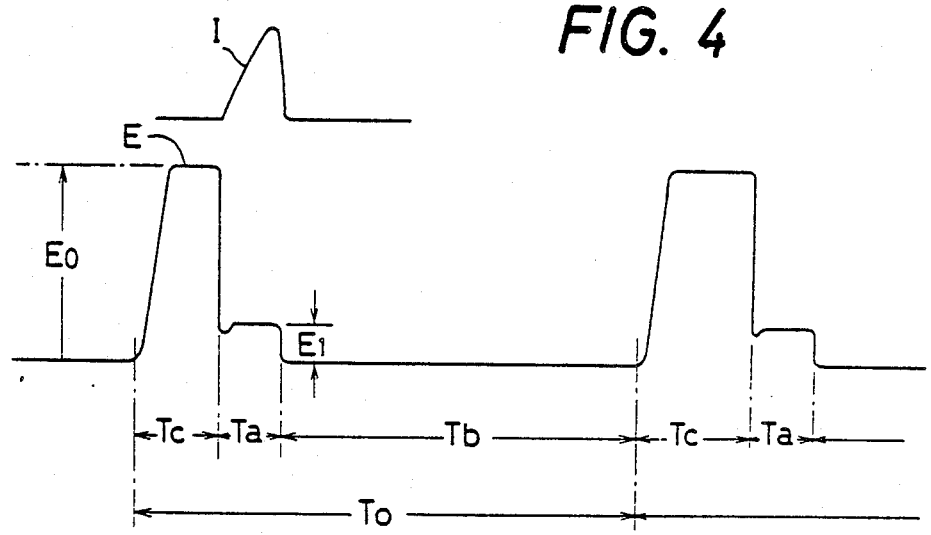
FIG. 4 is a diagrammatic representation of waveforms illustrating an electrical discharge cycle of the machining system.

There is shown in FIG. 2 an electrical discharge power supply circuit wherein a DC power source 111 is connected at one terminal thereof to the wire electrode 38 via a MACHINE START switch 112, a resistor 113, a coil 114, a diode 115, and a field-effect transistor (hereinafter referred to as "FET") 116 which serves as a switching element of the power supply circuit. The other terminal of the DC power source 111 is connected to the workpiece W through a power supply line 117. When the MACHINING START switch 112 is turned on, the DC power source 111 charges a capacitor 118. With the FET 116 turned on, the charged capacitor 118 applies a voltage between the workpiece W and the wire electrode 38. This voltage is referred to herein as "gap voltage". As soon as the current machining gap D has become narrower than a critical value due to movements of the workpiece W by the Y- and X-feed motors 20, 24, an electrical discharge starts between the workpiece W and the electrode 38, and an electrical spark jumps the machining gap D. As will be discussed in more detail, the FET 116 is turned off a predetermined time interval after the start of the electrical discharge, and held off for another predetermined time interval to provide a rest time. Upon expiration of the rest time, the next electrical discharge cycle beings with the fET 116 turned on again, as indicated in FIG. 4. Thus, the electrical discharge cycles are repeated.

As illustrated in FIG. 4, the period T0 of each electrical discharge cycle consists of: a pre-discharge time Tc between the turning-on of the FET 116 and the start of the electrical discharge; an electrical-discharge time Ta between the start of the electrical discharge and the turning-off of the FET 116; and a rest time Tb between the turning-off of the FET 116 and the following turning-on of the FET 116. The pre-discharge time Tc is not fixed, i.e., variable depending upon voltage E0 and the machining gap D, while the electrical-discharge time Ta and the rest time Tb are fixed values which are determined so as to attain maximum machining efficiency.

A resistor 119 and a diode 120 are connected between a drain terminal of the FET 116 and the power supply line 117, in order to remove the reactance induced by switching actions of the FET 116.

A transformer 121 is provided in the power supply line 117, to detect the start of electrical discharge of each cycle. That is, the transformer 121 detects a flow of current through the supply line 117 when the electrical discharge takes place between the workpiece W and the wire electrode 38 while the FET 116 is held in the on position. The transformer 121 is connected to a light emitting element 124 via resistors 122 and 123. Upon detection of a current flow through the supply line 117, the transformer 121 causes the light emitting element 124 to be activated. The light from the element 124 is transmitted through an optical fiber 125 and is received, as DISCHARGE DETECTION signal SG1, by a light receiving element 127 (indicated in FIG. 3) which will be described. Reference numeral 126 designates a zener diode 126 for protecting the light emitting element 124. In the present embodiment, the transformer 121, light emitting element 124, etc. constitute detecting means for detecting the electrical discharge and generating the signal SG1 indicative of the electrical discharge.

In the schematic block diagram of FIG. 3, there is shown a control system for controlling the operation of the Y-feed motor 20 and the X-feed motor 24 of the X-Y feed device 14, and the operation of the FET 116. As previously indicated, the DISCHARGE DETECTION signal SG1 transmitted through the optical fiber 125 is received by the light receiving element 127.

In response to the DISCHARGE DETECTION signal SG1, the light receiving element 127 is turned on and sends a RECEIVE signal SG2 to a central processing unit (hereinafter called "CPU") 128.

The CPU 128 is provided with a read-only memory (hereinafter referred as "ROM") 129, and a random-access memory (hereinafter called "RAM") 130. The CPU 128 is operated according to control programs stored in the ROM 129. The RAM 130 stores various kinds of data used by the CPU 128, as well as temporarily stores various data for data processing by the CPU 128. In response to the RECEIVE signal SG2, the CPU 128 feeds a START signal SG3 to a programmable timer 131 and a delay circuit 132.

Upon receipt of the START signal SG3 from the CPU 128, the programmable timer 131 starts measurement of a second predetermined time interval T2 based on clock pulses CL generated from the CPU 128, and provides an ON signal SG4 upon expiration of the time interval T2.

The second predetermined time interval T2 which is preset in the programmable timer 131, is a sum of the electrical-discharge time Ta and the rest time Tb of the period T0. This time interval T2 is determined by second time data D2 which is transferred from the CPU 128 to the programmable timer 131.

Similarly, upon receipt of the START signal SG3 from the CPU 128, the delay circuit 132 starts measurement of a first predetermined time interval T1, and presents an OFF signal SG5 when the time interval T1 has elapsed. The time interval T1 represents the electrical-discharge time Ta, and is determined by first time data D1 which is transferred from the CPU 128 to the delay circuit 132.

Plural sets of first time data D1 are stored in the RAM 130, and the suitable set of first time data D1 is selected by a SURFACE FINISH selector switch 133 which is manipulated to designate a desired surface finish of the workpiece W. The selected first time data D1 is read out from the RAM 130 by the CPU 128 and transferred to the delay circuit 132. Similarly, plural sets of second time data D2 are stored in the RAM 130, and the suitable set of second time data D2 is selected based on various machining condition data entered through a keyboard 128a, such as data on the material of the workpiece W, data on the cutting depth (height of the workpiece W), data on the rate of lengthwise feed of the wire electrode 38. The selected second time data D2 is read out from the RAM 130 by the CPU 128 and transferred to the programmable timer 131.

An RS flip-flop circuit (hereinafter referred to as "FF circuit") 134 receives the set signal SG4 from the programmable timer 131, and the reset signal SG5 from the delay circuit 132. Based on the received signals SG4 and SG5, the FF circuit 134 feeds FET CONTROL signals SG6 to the gate terminal of the FET 116. Stated more specifically, the FF circuit 134 generates the FET CONTROL signals SG6 in response to the set and reset signals SG4 and SG5, to turn on and off the FET 116, respectively. Thus, the CPU 128, programmable timer 131, delay circuit 132 and FF circuit 134 constitute switching control means for turning off the FET 116 at the end of the first predetermined time interval T1 (electrical-discharge time Ta), and for turning on the FET 116 at the end of the second predetermined time interval T2 (Ta+Tb).

As will be described in greater detail, the CPU 128 also serves: as a counter for counting the number of actual electrical discharges or sparks; as monitoring means for monitoring machining conditions; as means for calculating an average gap voltage applied between the workpiece W and the wire electrode 38; and as means for calculating an average gap current flowing through the machining gap D.

More particularly, the CPU 128 incorporates a counter which counts the RECEIVE signals SG2 which have been received from the light receiving element 127 within each preset sampling interval Ts (100 msec., in this specific embodiment). Thus, the counter counts the number Ns of actual electrical discharges which have occurred during each sampling interval Ts. This number Ns is hereinafter referred to as "sampling number Ns" of electrical discharges.

The CPU, as the monitoring means, checks to see if the wire electrode 38 is in contact (electrically shorted) with the workpiece W, i.e., to see if an electrical discharge between these members is impossible due to the physical contact therebetween, or not. To this end, the CPU 128 compares the counted sampling number Ns to a predetermined reference number Nx. The CPU 128 judges that the wire electrode 38 has contacted the workpiece W, if the sampling number Ns is equal to the reference number Nx.

The reference number Nx represents the number of electrical discharges which take place during the sampling intervals Ts, provided that the pre-discharge time Tc of the period T0 (Ta+Tb+Tc) is zero. In other words, the reference number Nx indicates the number of discharges which occurs within the sampling interval Ts (100 msec.) which is equal to the period T2 (=Ta+Tb).

It will be understood that when the sampling number Ns is equal to the reference number Nx, the pre-discharge time Tc (between the turning-on of the FET 116 and the start of an electrical discharge) is zero, that is, the wire electrode 38 is shorted with the workpiece W. Stated more particularly, the CPU 128 judges that the electrical shorting has occurred, if the sampling number Ns is substantially equal to, but slightly smaller than the reference number Nx. However, it is possible that the reference number Nx be selected to be slightly smaller than the theoretical number of discharges which occur in the interval Ta+Tb. In this case, the CPU 128 is adapted to make the judgement of the presence of an electrical shorting when the sampling number Ns has become equal to the reference number Nx. In this event, the CPU 128 recognizes the presence of the electrical shorting, the CPU 128 proceeds to stop the feeding movement of the workpiece, retract the workpiece away from the electrode 38 by a small distance to provide a suitable machining gap D, and then re-start the feeding movement to resume the machining cycle.

The CPU 128, as the average voltage calculating means, calculates an average gap voltage Em, according to the following equation (1), based on the pre-discharge time Tc, electrical-discharge time Ta, rest time Tb, and actual gap voltages E0 and E1 which are applied between the workpiece W and the wire electrode 38 during the lengths of the times Tc and Ta, respectively.

$$Em = (Tc \cdot E0 + Ta \cdot E1)/(Ta + Tb + Tc) \qquad (1).$$

Therefore, the average gap voltage Em may be obtained without the use of a voltmeter.

Further, the CPU 128, as the average current calculating means, calculates an average gap current Im flowing through the machining gap D, according to the following equation (2), based on the period T0 (Ta+Tb+Tc) and an actual gap current I flowing through the machining gap D during the length of the electrical-discharge time Ta.

$$Im = I \cdot Ta/T0 \qquad (2)$$

The value I.Ta is obtained from an electrical pulse waveform which is predetermined as needed. Therefore, the average gap current Im can be obtained without the use of an ammeter.

It is noted that since the electrical-discharge and rest times Ta and Tb are predetermined and since the sampling number Ns of electrical discharges in each sampling interval Ts is known, the pre-discharge time Tc (more precisely, average pre-discharge time) can be easily calculated for each sampling interval Ts.

As shown in FIG. 3, the instant machining system is provided with a cathode ray tube (hereinafter called "CRT") 135 serving as display means. The CPU 128 operates to cause the CRT 135 to display the aforementioned various data Ns, Em, Im, and provide information concerning the electrical shorting between the workpiece W and the wire electrode 38, or magnitude of the machining gap D. the CPU 128 operates to indicate the sampling number Ns on an electromagnetic counter 136.

To regulate an actual feed rate F1 of feeding movements (by the motors 20, 24) of the workpiece W relative to the wire electrode 38, the CPU 128 compares the sampling number Ns of actual electrical discharges during each sampling interval Ts, to a preset optimum number of electrical discharges, and calculates a target feed rate F0 of the feed device 14 for maximum machining efficiency.

Described in more detail, the optimum number Nz of electrical discharges is calculated according to the following equation (3), provided that the sampling interval Ts is 100 msec., and that the pre-discharge time Tc is 1.5 μsec:

$$Nz = Ts/(Ta+Tb+Tc) = 100000/(Ta+Tb+1.5) \qquad (3)$$

In this connection, it is noted that the value of the pre-discharge time Tc is predetermined, based on experimentations, so as to attain maximum machining efficiency, and stored in the ROM 129. Upon calculation of the optimum number Nz, the predetermined pre-discharge time Tc is read out by the CPU 128 from the ROM 129.

Then, the CPU 128 detects the actual feed rate F1 based on the operating speeds of the Y- and X-feed motors 20, 24, and calculates the target feed rate F0 according to the following equation (4):

$$F0 = F1 \cdot Nz/Ns \qquad (4)$$

Successively, the CPU 128 obtains a compensation amount ΔF by solving the following equation (5)

$$\Delta F = (F0 - F1) \cdot 0.8 \qquad (5)$$

The CPU 128 modifies the drive signals to be applied to the motors 20, 24 via the driver circuit 137, by the obtained compensation amount ΔF, so that a difference between the actual feed rate F1 and the target feed rate F0 is reduced to zero. Namely, the actual feed rate F1 is regulated so that it coincides with the target feed rate F0.

Referring next to FIG. 5, the operation of the instant machining system constructed as described hitherto will be described. The flow chart of FIG. 5 indicates only selected events of operation of the machining system.

Prior to starting an electrical discharge machining operation, the SURFACE FINISH selector switch 133 is set to select a desired level of surface finish to be attained on the workpiece W. In addition, data indicative of the specific machining conditions such as material and height (cutting depth) of the workpiece W and velocity of lengthwise feed of the wire electrode 38, are entered through the keyboard 128a. Upon entry of these data, the CPU 128 reads out from the RAM 130 the corresponding first and second time data D1 and D2 which represent the first and second predetermined time intervals T1 (=Ta) and T2 (=Ta+Tb), respectively. Based on the read-out time data D1 and D2, these time intervals T1 and T2 are set in the delay circuit 132 and the programmable timer 131, respectively.

As indicated at S1 in FIG. 5, the optimum number Nz of electrical discharges is calculated based on the predetermined time intervals T1 and T2, and on the preset pre-discharge time Tc, for example, 1.5 μsec. In the above indicated conditions, the machining operation is started. The CPU 128 reads the count of the incorporated counter which counts the number Ns of actual electrical discharges during each sampling interval Ts of 100 msec, as also indicated at S1. Further, the CPU 128 obtains the current feed rate F1, and calculates the compensation amount ΔF of feed rate as indicated at S2, based on the current feed rate F1, so that the current feed rate F1 coincides with the target feed rate F0. According to the obtained compensation amount ΔF, the CPU 128 controls the driver circuit 137 to regulate the actual feed rate F1 of each drive motor 20, 24 so as to reduce a difference between the values F1 and F0, as indicated at S3.

For example, if the actual feed rate F1 is too low and machining gap D is narrowed slowly, the feed rate compensation amount ΔF is increased accordingly, in order to raise the actual feed rate F1 to the level of the target feed rate F0. In this manner, the electrical discharge frequency (number of discharges per unit time) is optimized for maximum machining efficiency.

Successively, the CPU 128 compares the sampling number Ns to the reference number Nx, to check if these values are equal, as indicated at S4 in FIG. 5, namely to see whether the workpiece W and the wire electrode 38 are in contact with each other (check if an electrical shorting exists therebetween). In the event that the CPU 128 judges that the sampling number Ns is substantially equal to the reference number Nx, the CPU 128 causes the CRT to provide information indicating the presence of an electrical shorting (contact) between the workpiece W and the wire electrode 38, as indicated at S5. In the meantime, the CRT 135 displays the sampling number Ns, average gap voltage Em and average gap current Im at the time of detection of the electrical shorting. In the case that the sampling number Ns is not substantially equal to the reference number Nx, the CPU 128 goes to step S8 wherein the CPU 128 causes the CRT 135 to indicate the absence of the electrical shorting (contact), and the current values Ns, Em and Im.

In the foregong arrangement, the operator can monitor the machining conditions by observing the CRT 135. In particular, the observation of an increasing or decreasing tendency of the sampling number Ns permits easy finding of the current machining gap D. Furthermore, the operator may know the average gap voltage and current Em and Im, without a voltmeter and an ammeter as used in the known machining system.

While the present embodiment of the machining system is adapted to start adjustment of the actual feed rate F1 so as to coincide with the optimum feed rate F0 as soon as the machining operation has been started, it is possible to use larger values for the time interval T2 and the pre-discharge time Tc for an initial period of the machining operation. In this initial period, the optimum number Nz is determined based on these larger values, and the actual feed rate F1 is adjusted based on the thus determined number Nz. In this case, the predetermined values for the time interval T2 and pre-discharge time Tc are decreased in steps at predetermined time intervals, so that the actual feed rate F1 is eventually adjusted to the optimum feed rate F0 which corresponds to the optimum time interval T2 and pre-discharge time Tc.

In the instant electrical machining system which has been described in detail, the number Ns of electrical discharges or sparks per unit of time Ts is obtained, and the obtained number Ns is compared to the predetermined optimum number Nz so that a difference between these numbers Ns and Nz is used as signals to regulate the feed rate of the feed device 14 to an optimum level at which the machining operation is effected at maximum efficiency, regardless of the specific machining conditions which have been determined for the particular machining operation. Hence, the instant electrical machining system has eliminated the conventional needs of measuring or detecting the average gap voltage, and of using a voltmeter, an ammeter, an A/D converter, and other devices for controlling the rate of relative feeding movements between the workpiece and the electrode (tool). Accordingly, the instant machining system is available at a relatively reduced cost. Further, the monitoring means as discussed provides useful information necessary to accomplish efficient machining operations.

While the present invention has been described in its preferred embodiment, it is to be understood that the invention is not confined to the precise details of the disclosure herein, but the invention may be otherwise embodied with various changes, modifications and improvements within the scope of the invention defined in the appended claims.

What is claimed is:

1. An electrical discharge machining system wherein an electrically conductive workpiece and an electrode are moved relative to each other with a machining gap maintained between the electrode and the workpiece, and wherein the workpiece is machined through the energy of electrical discharges at the machining gap by application of a voltage between the workpiece and the electrode, comprising:

a feed device for effecting a relative movement between the workpiece and the electrode;

an electrical discharge power supply circuit for applying power from a power source to the workpiece and the electrode, said power supply circuit incorporating a switching element which closes and opens said power supply circuit;

switching control means for turning off said switching element at the end of a first predetermined time interval after a start of each electrical discharge which takes place between the workpiece and the electrode during said relative feeding movement while said switching element is held on, and for turning on said switching element at the end of a second predetermined time interval after the start of said electrical discharge, said second predetermined time interval being longer than said first predetermined time interval, a cycle time of each electrical discharge consisting of a sum of said second predetermined time interval and a pre-discharge time between the turning-on of said switching element and said start of each electrical discharge, said second predetermined time interval consisting of a sum of an electrical-discharge time represented by said first predetermined time, and a rest time following said electrical discharge time;

a counter for counting the number of actual electrical discharges which have occurred between the workpiece and the electrode during a preset sampling interval;

feed control means for controlling the operation of said feed device to regulate a rate of said relative feeding movement between the workpiece and the electrode, so as to reduce a difference between the counted number of said actual electrical discharges and a preset optimum number of electrical discharges;

arithmetic means for calculating an average predischarge time, based on said sampling interval, said second predetermined time interval and the counted number of said actual electrical discharges;

means for calculating an average gap current flowing through said machining gap, based on the calculated average predischarge time, said electrical-discharge time, said rest time, and an actual gap current flowing through said machining gap during a length of said electrical-discharge time; and display means for indicating the calculated average gap current.

2. The electrical discharge machining system of claim 1, wherein said switching control means comprises:

detecting means for detecting said start of each electrical discharge and generating a detection signal indicative of said start;

a first timer responsive to each said detection signal to start measurement of said first predetermined time interval;

a second timer responsive to each said detection signal to start measurement of said second predetermined time interval; and means for turning off said switching element when said first timer has timed out, and for turning on said switching element when said second timer has timed out.

3. The electrical discharge machining system of claim 1, wherein said feed control means comprises means for detecting an actual feed rate of said feed device, and means for calculating a target feed rate based on said counted number of actual electrical discharges, said preset optimum number of electrical discharges, and the detected actual feed rate, said feed control means controlling the operation of said feed device so as to reduce a difference between said detected actual feed rate and the calculated target feed rate.

4. The electrical discharge machining system of claim 1, further comprising monitoring means for monitoring machining conditions of the machining system, said monitoring means comparing said counted number of actual electrical discharges counted by said counter to a predetermined reference number of electrical discharges which is different from said preset optimum number, said monitoring means providing a monitoring output according to a relation between said counted number and said predetermined reference number.

5. The electrical discharge machining system of claim 4, wherein said predetermined reference number represents the number of electrical discharges which take place during said sampling interval, provided that a time interval between the turning-on of said switching element and the start of each said electrical discharge is zero, said monitoring means providing an output signal indicative of a physical contact of said electrode with said workpiece when said counted number of actual electrical discharges is substantially equal to said predetermined reference number.

6. The electrical discharge machining system of claim 1, wherein said electrode consists of a metal wire which is continuously fed lengthwise along said machining gap relative to the workpiece.

7. The electrical discharge machining system of claim 1, further comprising means for calculating an average gap voltage applied between the workpiece and the electrode, based on said average pre-discharge time, said electrical-discharge time, said rest time, and actual gap voltages applied between the workpiece and the electrode during individual lengths of said pre-discharge and electrical-discharge times, and further comprising display means for indicating the calculated average gap voltage.

8. An electrical discharge machining system wherein an electrically conductive workpiece and an electrode are moved relative to each other with a machining gap maintained between the electrode and the workpiece, and wherein the workpiece is machined through the energy of electrical discharges at the machining gap by application of a voltage between the workpiece and the electrode, comprising:

a feed device for effecting a relative movement between the workpiece and the electrode;

an electrical discharge power supply circuit for applying power from a power source to the workpiece and the electrode, said power supply circuit incorporating a switching element which closes and opens said power supply circuit;

switching control means for turning off said switching element at the end of a first predetermined time interval after a start of each electrical discharge which takes place between the workpiece and the electrode during said relative feeding movement while said switching element is held on, and for turning on said switching element at the end of a second predetermined time interval after the start of said electrical discharge, said second predetermined time interval being longer than said first predetermined time interval, a cycle time of each electrical discharge consisting of a sum of said second predetermined time interval and a pre-discharge time between the turning-on of said switching element and said start of each electrical discharge, said second predetermined time interval consisting of a sum of an electrical discharge time represented by said first predetermined time, and a rest time following said electrical discharge time;

a counter for counting the number of actual electrical discharges which have occurred between the workpiece and the electrode during a preset sampling interval;

feed control means for controlling the operation of said feed device to regulate a rate of said relative feeding movement between the workpiece and the electrode, so as to reduce a difference between the counted number of said actual electrical discharges and a preset optimum number of electrical discharges;

arithmetic means for calculating an average predischarge time, based on said sampling interval, said second predetermined time interval and the counted number of said actual electrical discharges;

means for calculating an average gap voltage applied between the workpiece and the electrode, based on the calculated average pre-discharge time, said electrical-discharge time, said rest time, and actual gap voltages applied between the workpiece and the electrode during individual lengths of the pre-discharge and electrical-discharge times; and display means for indicating the calculated average gap voltage.

9. The electrical discharge machining system of claim 8, wherein said switching control means comprises:

detecting means for detecting said start of each electrical discharge and generating a detection signal indicative of said start;

a first timer responsive to each said detection signal to start measurement of said first predetermined time interval;

a second timer responsive to each said detection signal to start measurement of said second predetermined time interval; and means for turning off said switching element when said first timer has timed out, and for turning on said switching element when said second timer has timed out.

10. The electrical discharge machining system of claim 8, wherein said feed control means comprises means for detecting an actual feed rate of said feed device, and means for calculating a target feed rate based on said counted number of actual electrical discharges, said preset optimum number of electrical discharges, and the detected actual feed rate, said feed control means controlling the operation of said feed rate and the calculated target feed rate.

11. The electrical discharge machining system of claim 8, further comprising monitoring means for monitoring machining conditions of the machining system, said monitoring means comparing said counted number of actual electrical discharges counted by said counter to a predetermined reference number of electrical discharges which is different from said preset optimum number, said monitoring means providing a monitoring output according to a relation between said counted number and said predetermined reference number.

12. The electrical discharge machining system of claim 11, wherein said predetermined reference number represents the number of electrical discharges which take place during said sampling interval, provided that a time interval between the turning-on of said switching element and the start of each said electrical discharge is zero, said monitoring means providing an output signal indicative of a physical contact of said electrode with said workpiece when said counted number of actual electrical discharges is substantially equal to said predetermined reference number.

13. The electrical discharge machining system of claim 8, wherein said electrode consists of a metal wire which is continuously fed lengthwise along said machining gap relative to the workpiece.

* * * * *